United States Patent [19]
Grob et al.

[11] Patent Number: 6,101,397
[45] Date of Patent: Aug. 8, 2000

[54] METHOD FOR PROVIDING A VOICE REQUEST IN A WIRELESS ENVIRONMENT

[75] Inventors: Matthew S. Grob, San Diego; Gadi Karmi, Del Mar, both of Calif.

[73] Assignee: Qualcomm Incorporated, San Diego, Calif.

[21] Appl. No.: 08/757,418

[22] Filed: Nov. 27, 1996

Related U.S. Application Data

[63] Continuation of application No. 08/517,707, Aug. 22, 1995, abandoned, which is a continuation of application No. 08/152,161, Nov. 15, 1993, abandoned.

[51] Int. Cl.[7] .................................................. H04Q 7/32
[52] U.S. Cl. ...................... 455/557; 455/403; 379/100.16
[58] Field of Search .................................. 455/403, 422, 455/557, 559, 561, 550, 414; 379/93.01, 93.06, 93.14, 93.15, 100.15, 100.16; 358/434, 442

[56] References Cited

U.S. PATENT DOCUMENTS

| | | | |
|---|---|---|---|
| 4,353,097 | 10/1982 | Takeda et al. | 379/100 |
| 4,654,867 | 3/1987 | Labedz et al. | 379/59 |
| 4,697,281 | 9/1987 | O'Sullivan | 379/59 |
| 4,837,800 | 6/1989 | Freeburg et al. | 379/63 |
| 4,922,524 | 5/1990 | Baba et al. | 379/100.16 |
| 4,972,457 | 11/1990 | O'Sullivan | 379/63 |
| 5,119,375 | 6/1992 | Paneth et al. | 379/59 |
| 5,187,736 | 2/1993 | Moriizumi | 379/100 |
| 5,263,078 | 11/1993 | Takahashi et al. | 379/58 |
| 5,297,203 | 3/1994 | Rose et al. | 379/61 |
| 5,311,580 | 5/1994 | Otsuka et al. | 379/100 |
| 5,450,472 | 9/1995 | Brax | 379/58 |
| 5,452,474 | 9/1995 | Kagawa | 379/100 X |

FOREIGN PATENT DOCUMENTS

| | | | |
|---|---|---|---|
| 2198315 | 6/1988 | United Kingdom | H04Q 7/00 |
| 2258368 | 2/1993 | United Kingdom | H04Q 7/04 |

OTHER PUBLICATIONS

Article entitled "Digital Mobile Radio switching System" by N. Shinagawa, IEEE Global Telecommunications Conference & Exhibition, vol. 1 of 2, Dec. 1990, pp. 485–489.
International Search Report dated Mar. 16, 1995.

Primary Examiner—Dwayne D. Bost
Assistant Examiner—William G. Trost
Attorney, Agent, or Firm—Russell B. Miller; Brian S. Edmonston

[57] ABSTRACT

The process of the present invention enables a mobile radiotelephone to signal a request for a voice connection after transmission of a facsimile image. The user depresses a button on the radiotelephone when a voice connection is needed. The radiotelephone transmits the request as a frame of data to the base station. The base station interprets the request and, after the facsimile transmission, turns off the modems and turns on the speech coders in anticipation of the voice signal.

20 Claims, 2 Drawing Sheets

METHOD FOR PROVIDING A VOICE REQUEST IN A WIRELESS ENVIRONMENT

The present application is a continuation of application Ser. No. 08/517,707, now abandoned, filed Aug. 22, 1995, which is a continuation of application Ser. No. 08/152,161, filed Nov. 15, 1993, now abandoned.

BACKGROUND OF THE INVENTION

I. Field of the Invention

The present invention relates to wireless communications. More particularly, the present invention relates to the field of facsimile communications in a wireless environment.

II. Description of the Related Art

Facsimile equipment operating over the public switched telephone network (PSTN) can employ a voice request feature. If the facsimile user wishes to initiate a conversation with the other party after the facsimile is completed, the user can use a switch or other interface means to request the facsimile equipment to switch to voice mode at the completion of the facsimile transfer. The signaling that occurs over the PSTN segment for such a voice request is defined in CCITT recommendations T.4 and T.30 and are known in the art.

The voice request feature would be especially beneficial to mobile radiotelephone users who are charged for air time and/or on a per call basis. The voice request capability would allow the user to transmit a facsimile image and then immediately converse with the other party without generating a new call or interrupting the facsimile transmission. Digital facsimile equipment and computers that connect to radiotelephones operating in a digital cellular system, however, do not have the capability to generate the required signaling to perform this feature. There is a resulting need for a voice request feature for mobile radiotelephone systems.

SUMMARY OF THE INVENTION

The process of the present invention encompasses a process for requesting a voice connection after a facsimile transmission in a wireless communication environment. The wireless communication environment is comprised of means for processing that is coupled to a wireless modem having a switch control. The wireless modem is coupled to a base station over a radio frequency channel. The process begins by the wireless modem transmitting, over the radio frequency channel, a facsimile image from the means for processing. A command is then input to the wireless modem using the switch control to request a voice connection upon cessation of the facsimile transmission. The wireless modem then transmits the voice connection request to the base station.

DETAILED DESCRIPTION OF THE PREFERRED EMBODIMENT

Figure 2:
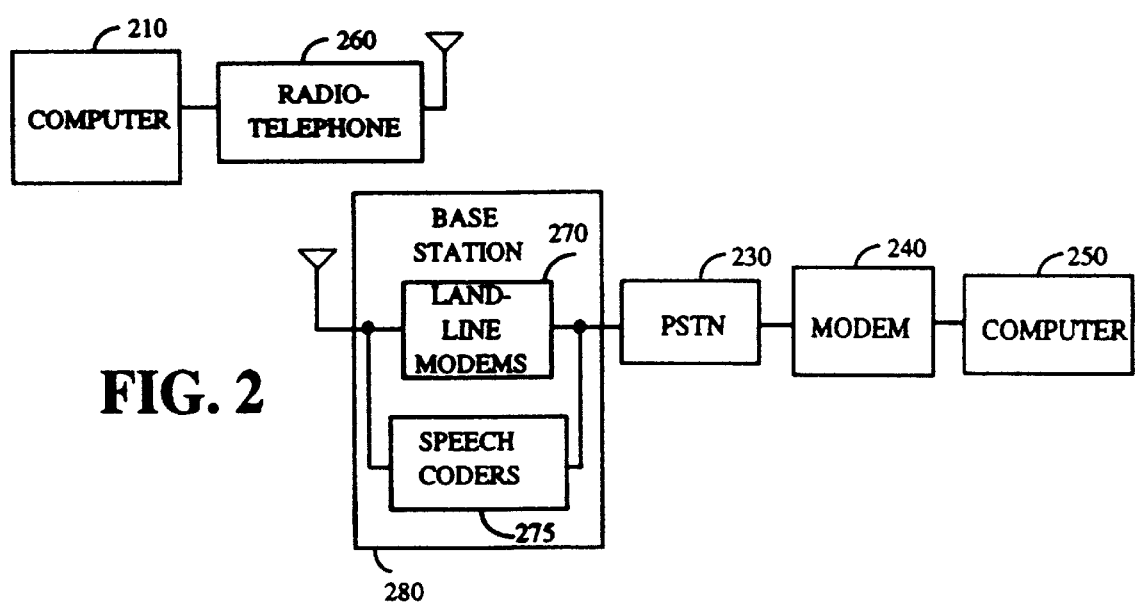
FIG. 2 shows a block diagram of a typical cellular radiotelephone system in accordance with the present invention.

In the preferred embodiment, the process of the present invention operates in the radiotelephone system illustrated in FIG. 2. This system is comprised of a computer (210) that has a facsimile adapter and appropriate facsimile software. The computer (210) is coupled to a radiotelephone (260) that has a digital cellular mode. The radiotelephone (260) acts as a wireless modem since it takes data from the computer (210), encodes and modulates the data, and transmits it over the channel. In the preferred embodiment, the radiotelephone (260) encodes and modulates the data in the format required by the specification EIA/TIA IS-95 for code division multiple access (CDMA) communications. The following discussion will refer to the preferred embodiment of the wireless modem as a radiotelephone having a digital transmission mode.

A base station (280) receives the signal from the radiotelephone (260) and demodulates and decodes it. The base station (280) is comprised of a group of land-line modems (270) and speech coders (275) that operate over the PSTN (230). These land-line modems (270) encode and convert the data signal into an audio signal according to various schemes known in the art, such as CCITT V.27, V.27ter, V.17, and V.29. The speech encoders (275) encode and convert between the digital vocoded data from radio telephone (260) and the audio signaling used on PSTN (230). The data signal is then switched over the PSTN (230) to a modem (240) located at the telephone number called by the remote computer/radiotelephone combination (210 and 260). The modem (240) converts this signal into a digital signal that can be interpreted by the receiving computer (250).

Figure 3:
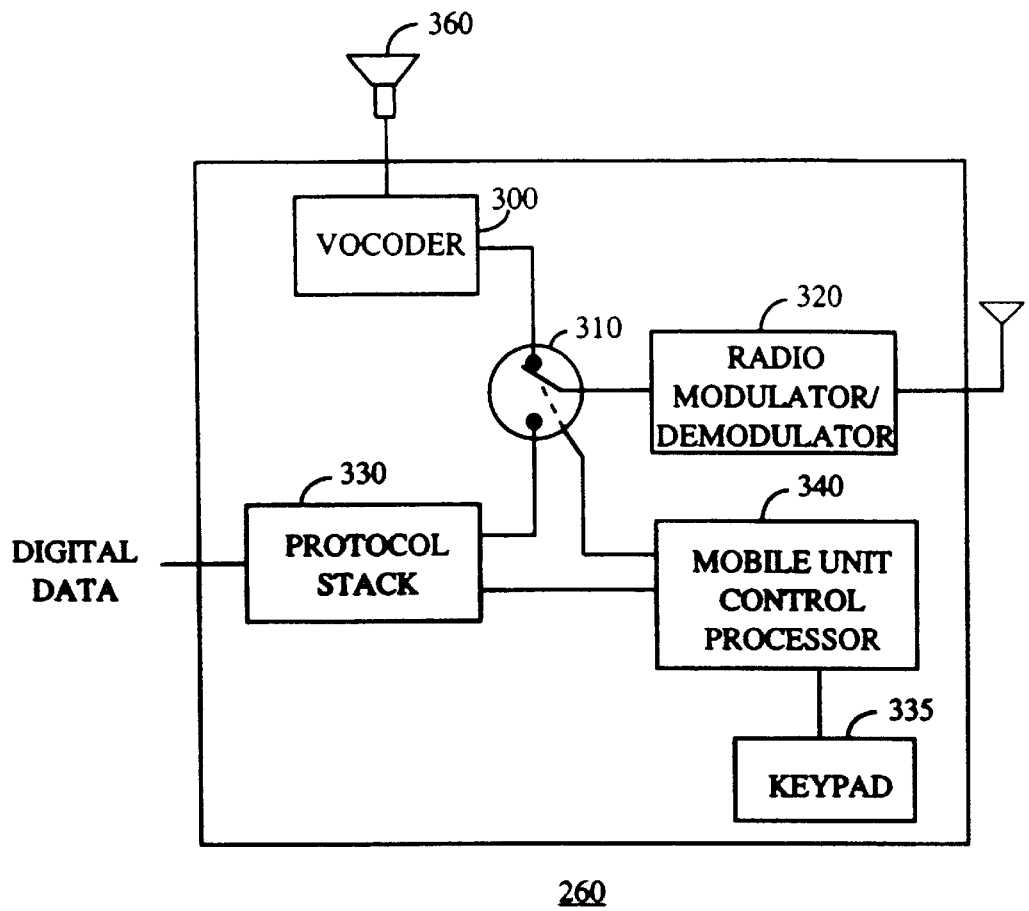
FIG. 3 shows a block diagram of a typical radiotelephone having a digital mode in accordance with the process of the present invention.

FIG. 3 illustrates a simplified block diagram of the radiotelephone (260) of the present invention. The digital data from the computer (210) is input to the protocol stack (330) within the radiotelephone (260). The protocol stack (330) is capable of bidirectional communication with the computer (210), a mobile unit control processor (340), and a radio modulator/demodulator (320).

When the protocol stack (330) receives digital data from the computer for transmission over the wireless link, it performs any required encoding and passes the encoded information to the radio modulator/demodulator (320) through a switch (310). The radio modulator/demodulator (320) modulates the encoded information and transmits the signal over the wireless link. Inversely, when a signal containing information for the computer (210) is received, the radio modulator/demodulator (320) demodulates the signal and inputs it to the protocol stack (330) through the switch (310).

When the vocoder (300) receives analog information from the speaker/microphone (360) for transmission over the wireless link, it encodes the information so that the radio modulator/demodulator (320) can modulate the encoded information for transmission over the wireless link. When a signal containing information for output on the speaker/microphone (360) is received on the wireless link, the modulator/demodulator (320) demodulates the signal and provides it to the vocoder (300) through the switch (310). The vocoder (300) decodes the signal and provides audible output to the speaker/microphone (360).

The mobile unit control processor (340) provides control over the functions of the radiotelephone (360). Information intended for the mobile unit control processor (340) might come either over the wireless link or from digital data from the computer. The protocol stack (330) directs information intended for the mobile unit control processor (340) to it and receives commands and information for transmission from the mobile unit control processor (340). The mobile unit control processor (340) controls the switch (310), directing signals from the radio modulator/demodulator (320) to either the vocoder (300) or the protocol stack (330) and vice versa.

The protocol stack (330) provides the main control center for communication with the computer over the wireless link. The protocol stack (330) must recognize and operate under a variety of protocols. For instance, digital data may use a different format or protocol from the wireless link. Standard voice wireless connections do not provide the error free communication that is necessary for data transfer. The protocol stack (330) can provide a mechanism of error detection and error correction of both link directions.

The protocol stack (330) may need to provide flow control. Digital data may have a data rate that is higher than that of which the wireless link is capable. In this case the protocol stack (330) must store the excess or halt the flow of data and recall data at a rate appropriate for output on the link. The inverse situation could also be true in that the wireless link is capable of operating at a higher data rate than the computer is capable of receiving.

The protocol stack (330) also packetizes and unpacketizes data. In the preferred embodiment, the digital data provided by the computer is a steady stream of bits. The protocol stack (330) groups certain bits of information together for processing and transmission. These groups of data are called frames or packets and aid in error detection and correction. The protocol stack (330) packetizes the digital data provided by the computer into frames for the radio modulator/demodulator (320) and unpacketizes frames from the radio modulator/demodulator (320) into a digital data stream for the computer.

The radiotelephone (260) also has a keypad for entering data such as telephone numbers, alpha tags identifying the telephone numbers, and controlling the radiotelephone. The keypad (335) is coupled to the mobile unit control processor (340) that takes the information entered on the keypad (335) and translates it for use by the radiotelephone.

The keypad (335) includes a control key for requesting a voice connection after a facsimile transmission by the radiotelephone. In the preferred embodiment, this control key is the "SEND" key. The control key instructs the mobile unit control processor (340) to send a command to the protocol stack (330). The protocol stack (330) packetizes the command and includes it in the frames of facsimile data being transmitted to the base station (280). In the preferred embodiment, the packetized command is formatted as specified in the preliminary TIA specification PN-2812.

The base station (280) receives the packetized command requesting a voice connection and decodes it. When the radiotelephone (260) ends transmission of the facsimile data, the base station (280) signals the PSTN (230) that a voice connection has been requested.

Figure 1:
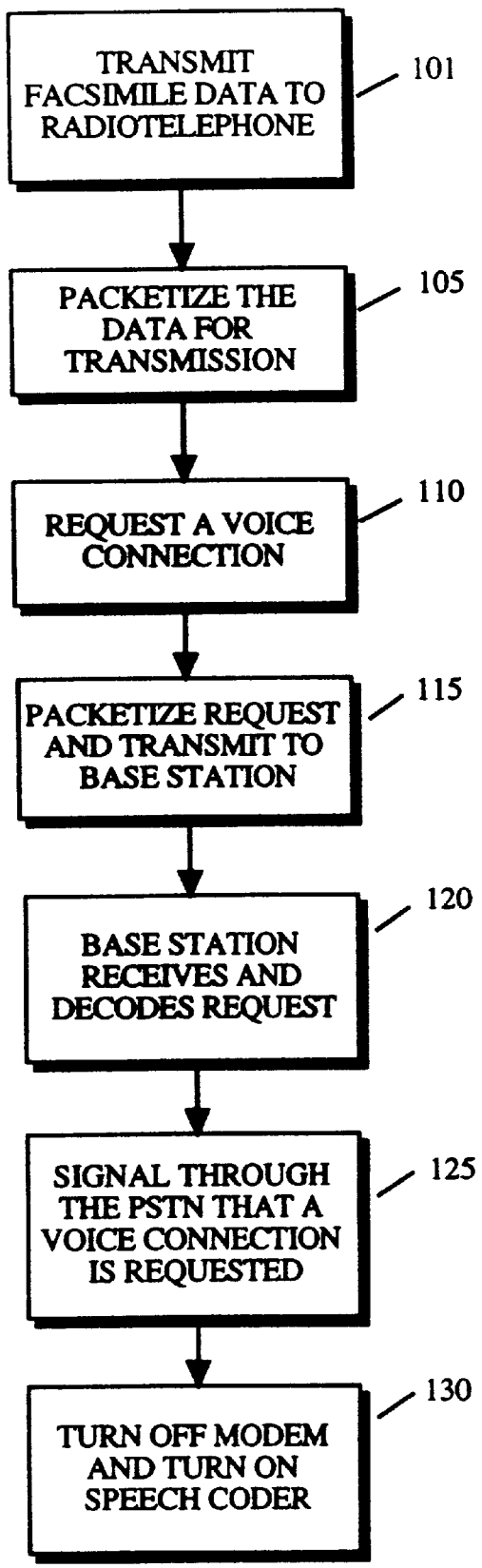
FIG. 1 shows a flowchart of the process of the present invention.

The process of the present invention is illustrated in the flowchart of FIG. 1. The process begins by the computer transmitting a digital signal, representing a facsimile image, to the radiotelephone (101). The radiotelephone packetizes the signal and transmits the signal to the base station (105). When a user depresses the SEND key on the keypad of the radiotelephone, requesting a voice connection (110) after the facsimile transmission is completed, the command is packetized and included as a frame of data (115) transmitted to the base station.

The base station receives and decodes the frame of data containing the voice connection request (120). The base station then waits until the end of the transmission of the facsimile image and signals through the PSTN to the receiving terminal, which can be a facsimile machine or a computer, that a voice request has been received (125). This signaling is illustrated in CCITT T.30 and T.4 and is well known in the art. The receiving facsimile machine can then signal the user by light or tone that a voice request has been received so that the user can pick up the phone. The voice conversation is then handled as is well known in the art between the land-line or mobile user and the other mobile user in a digital radiotelephone environment. Furthermore at the base station the decoded voice request is used to turn off the base station modem and turn on a speech coder to facilitate voice communication with the radio telephone (130).

Alternate embodiments replace the computer having a facsimile adapter with a dedicated facsimile machine. The facsimile machine transforms documents into the digital format for transmission by the wireless modem. Another embodiment uses a subset of the computer such as a personal digital assistant also having a facsimile adapter and/or facsimile software.

In yet another alternate embodiment, the computer generates the signal to the radiotelephone that a voice connection is requested. In this embodiment, the software that generates the facsimile document can prompt the user to decide whether a voice connection is needed after the facsimile transmission. If the user decides that a voice connection is needed, the computer software generates the signal by toggling a bit or sending a command word to the radiotelephone to request the voice connection.

Still another alternate embodiment of the process of the present invention uses multiple key inputs to request a voice connection. This is accomplished by the user inputting a key sequence or selecting the voice connection feature from a menu of the radiotelephone. Still another embodiment waits until the radiotelephone has completed transmission of the current page of the facsimile signal and then transmits the request for a voice connection. This would allow the parties to converse after each page has been sent instead of waiting for the entire document to be transmitted.

In summary, the process of the present invention enables a mobile radiotelephone user to initiate a voice request after a facsimile transmission. This allows the sender and receiver to converse after a document has been transmitted without incurring separate call charges for another call. The process also relieves either party of having to time the pick up the of the phone to occur immediately after the transmission of the facsimile so as not to lose the call.

We claim:

1. A system for conducting wireless communication involving voice and facsimile data comprising:

a facsimile device for providing facsimile data; and a radio telephone connected to said facsimile device, said radio telephone having a speaker/microphone for receiving voice signals;

a vocoder connected to said speaker/microphone for receiving the voice signals from said speaker/microphone and for encoding the voice signals for wireless transmission;

a protocol stack for receiving the facsimile data from said facsimile device and for encoding the facsimile data for wireless transmission;

a radio modulator/demodulator for receiving signals encoded for wireless transmission, for modulating the signals as wireless signals, for transmitting the wireless signals using an antenna over a wireless channel and for receiving and demodulating signals received by the antenna over the wireless channel;

a switch interconnecting said vocoder, said protocol stack and said radio modulator/demodulator; and a mobile unit control processor for controlling operation of said vocoder, said protocol stack, said radio modulator/demodulator and said switch;

with said mobile unit control processor operating in response to receipt of facsimile data from said facsimile device to control said switch to route facsimile data encoded for wireless transmission from said protocol stack to said radio modulator/demodulator for wireless transmission over the wireless channel and to route responsive signals received by said radio modulator/demodulator over the wireless channel to said protocol stack;

with said mobile unit control processor operating in response to receipt of a voice connection request signal during transmission of the facsimile data to control said protocol stack to incorporate an encoded voice connection request signal into the encoded facsimile data being routed to said radio modulator/demodulator for wireless transmission over the wireless channel; and with said mobile unit control processor operating in response to detection of the completion of transmission of facsimile data in which a voice connection request signal had been encoded to control said switch to route voice data received from said speaker/microphone and encoded for wireless transmission by said vocoder to said radio modulator/demodulator for wireless transmission over the wireless channel before other communication systems can use the wireless channel and to route responsive signals received by said radio modulator/demodulator over the wireless channel to said vocoder for output using said speaker/microphone.

2. The system of claim 1 wherein said facsimile device is a computer.

3. The system of claim 1 wherein said facsimile device provides facsimile data at a first rate and said radio modulator/demodulator transmits signals at a second rate and wherein said protocol stack buffers facsimile data routed there-between.

4. The system of claim 1 wherein said protocol stack operates to packetize a stream of facsimile data received from said facsimile device into frames for routing to said radio modulator/demodulator and to de-packetize a sequence of frames received from said radio modulator/demodulator for routing to said facsimile device as a stream of data.

5. The system of claim 4 wherein said protocol stack encodes said voice connection request signal as a packet as well.

6. The system of claim 4 wherein said frames are encoded to include error detection and correction bits.

7. The system of claim 4 wherein said vocoder operates to packetize voice signals received from said speaker/microphone into frames for routing to said radio modulator/demodulator and to de-packetize a sequence of frames received from said radio modulator/demodulator for routing to said speaker/microphone as output voice signals.

8. The system of claim 7 wherein said switch is a packet switch.

9. The system of claim 1 wherein said protocol stack operates to detect predetermined signals received from said facsimile device that are intended for said mobile unit control processor and to route said predetermined signals to said mobile unit control processor.

10. The system of claim 1 wherein said protocol stack operates to detect signals received from said radio modulator/demodulator that are intended for said mobile unit control processor and to route said predetermined signals to said mobile unit control processor.

11. The system of claim 1 wherein said protocol stack operates to convert signals from one protocol to another.

12. The system of claim 1 wherein the voice connection request signal is received from said facsimile device.

13. The system of claim 1 further including a keypad and wherein the voice connection request signal is received from said keypad.

14. The system of claim 1 wherein said mobile unit control processor operates in response to detection of the completion of each individual page of a transmission of facsimile data in which a voice connection request signal had been encoded to control said switch to route voice data received from said speaker/microphone and encoded for wireless transmission by said vocoder to said radio modulator/demodulator for wireless transmission over the wireless channel and to route responsive signals received by said radio modulator/demodulator over the wireless channel to said vocoder for output using said speaker/microphone.

15. The system of claim 1 further comprising a base station for receiving signals transmitted from the radio telephone over the wireless channel and for transmitting signals to the radio telephone over the wireless channel, said base station having a base station modem and a base station speech decoder and being coupled to a public switched telephone network (PSTN) which is in turn coupled to a receiving terminal, said base station operating in response to detection of the completion of reception of facsimile data in which a voice connection request signal had been encoded to turn off said base station modem, to turn on said one base station speech coder, and to signal the receiving to accept a voice connection.

16. A method for conducting wireless communication involving voice and facsimile data using a system having a facsimile device for providing facsimile data and a radio telephone connected to the facsimile device, with the radio telephone having a speaker/microphone; a vocoder connected to the speaker/microphone for receiving voice signals from the speaker/microphone and for encoding the voice signals for wireless transmission; a protocol stack; a radio modulator/demodulator for modulating signals encoded for wireless transmission as wireless signals, for transmitting the wireless signals using an antenna over a wireless channel and for receiving and demodulating signals received by the antenna over the wireless channel; and a switch interconnecting the vocoder, the protocol stack and the radio modulator/demodulator, the method comprising the steps of:

receiving facsimile data from the facsimile device;

controlling the protocol stack to encode the facsimile data for wireless transmission;

controlling the switch to route the facsimile data encoded for wireless transmission to the radio modulator/demodulator for wireless transmission over the wireless channel and to route responsive signals received by the radio modulator/demodulator over the wireless channel to the protocol stack;

receiving a voice connection request signal during transmission of the facsimile data;

controlling the protocol stack to incorporate an encoded voice connection request signal into the encoded facsimile data being routed to the radio modulator/demodulator for wireless transmission over the wireless channel;

detecting completion of transmission of the facsimile data in which the voice connection request signal had been encoded and, in response thereto, controlling the speaker/microphone to receive voice data and to route the voice data through the vocoder for encoding the voice signals for wireless transmission; and controlling the switch to route the voice data encoded for wireless transmission by the vocoder to the radio modulator/demodulator for wireless transmission over the wireless channel before other communication systems can use the wireless channel and to route responsive signals received by the radio modulator/demodulator over the wireless channel to the vocoder for output using the speaker/microphone.

17. The system of claim 16 wherein the facsimile device provides facsimile data at a first rate and the radio modulator/demodulator transmits signals at a second rate and wherein the protocol stack is controlled to buffer facsimile data routed there-between.

18. The system of claim 17 wherein the protocol stack is controlled to packetize a stream of facsimile data received from the facsimile device into frames for routing to the radio modulator/demodulator and to de-packetize a sequence of frames received from the radio modulator/demodulator for routing to the facsimile device as a stream of data.

19. The system of claim 16 wherein the protocol stack is controlled encodes the voice connection request signal as a packet as well.

20. A system for conducting wireless communication involving voice and facsimile data comprising:

means for providing facsimile data; and a radio telephone connected to said facsimile device, said radio telephone having speaker/microphone means for receiving voice signals;

vocoder means for receiving the voice signals from said speaker/microphone means and for encoding the voice signals for wireless transmission;

conversion means for receiving the facsimile data and for encoding the facsimile data for wireless transmission;

radio modulator/demodulator means for receiving signals encoded for wireless transmission, for modulating the signals as wireless signals, for transmitting the wireless signals using an antenna over a wireless channel and for receiving and demodulating signals received by the antenna over the wireless channel;

switch means for interconnecting said vocoder means, said conversion means and said radio modulator/demodulator means; and control means for controlling operation of said vocoder means, said conversion means, said radio modulator/demodulator means and said switch means;

with said control means including means, operative in response to receipt of facsimile data, for controlling said switch means to route facsimile data encoded for wireless transmission from said conversion means to said radio modulator/demodulator means for wireless transmission over the wireless channel and to route responsive signals received by said radio modulator/demodulator means over the wireless channel to said conversion means;

means, operative in response to receipt of a voice connection request signal during transmission of the facsimile data, for controlling said conversion means to incorporate an encoded voice connection request signal into the encoded facsimile data being routed to said radio modulator/demodulator mans for wireless transmission over the wireless channel; and means, operative in response to detection of the completion of transmission of facsimile data in which a voice connection request signal had been encoded, for controlling said switch means to route voice data received from said speaker/microphone and encoded for wireless transmission by said vocoder to said radio modulator/demodulator means for wireless transmission over the wireless channel before other communication systems can use the wireless channel and to route responsive signals received by said radio modulator/demodulator means over the wireless channel to said vocoder for output using said speaker/microphone means.

* * * * *